United States Patent [19]

Palmer et al.

[11] Patent Number: 4,630,522

[45] Date of Patent: Dec. 23, 1986

[54] ACOUSTICALLY DETONATED EXPLOSIVELY RELEASABLE LINK

[75] Inventors: James E. Palmer, Berwyn; Rocco D. Albertini, Media; Michael A. Coladonato, Havertown, all of Pa.

[73] Assignee: Baldt Incorporated, Chester, Pa.

[21] Appl. No.: 707,492

[22] Filed: Mar. 1, 1985

[51] Int. Cl.⁴ .............................................. F41F 5/00
[52] U.S. Cl. ..................................... 89/1.14; 114/230; 114/293
[58] Field of Search ................. 89/1.14; 60/632, 636; 114/230, 294, 293, 254, 253, 297; 59/93

[56] References Cited

U.S. PATENT DOCUMENTS

| | | |
|---|---|---|
| 785,881 | 3/1905 | Hill . |
| 3,084,597 | 4/1963 | Beyer .................... 114/294 |
| 3,130,703 | 4/1964 | Thompson ............... 89/1.14 |
| 3,171,180 | 3/1965 | Allison .................... 89/1.14 |
| 3,577,950 | 5/1971 | Gordon .................... 114/294 |
| 3,905,190 | 9/1975 | Pearlman . |
| 4,033,277 | 7/1977 | Schaper . |
| 4,067,282 | 1/1978 | Quinn et al. . |
| 4,559,890 | 12/1985 | Regalbuto et al. ........... 89/1.14 |

Primary Examiner—Harold D. Whitehead
Attorney, Agent, or Firm—Cushman, Darby & Cushman

[57] ABSTRACT

An acoustically detonated explosively separable link comprising a pair of bolt assemblies mounted in spaced operative relation within the separable link parts, each of which includes a bolt having a cavity therein. An explosive is provided in each cavity and an electrically actuated exploding bridge wire is connected with each explosive for detonating the same. A miniaturized acoustical receiver assembly is mounted within the link parts and includes a hydrophone for receiving a transmitted acoustical detonation signal, batteries and circuitry operatively connected with the hydrophone, the batteries and exploding bridge wires for conducting an electrical current from the batteries to the exploding bridge wires in response to the hydrophone receiving a transmitted acoustical detonation signal. A water pressure resistant container is mounted within the link parts between the pair of spaced bolt assemblies for containing the batteries and circuitry including the operative connections thereof free from contact with water under pressure and for retaining the hydrophone in a position of proximity to water under pressure such as to receive an acoustical detonation signal transmitted through the water under pressure.

20 Claims, 11 Drawing Figures

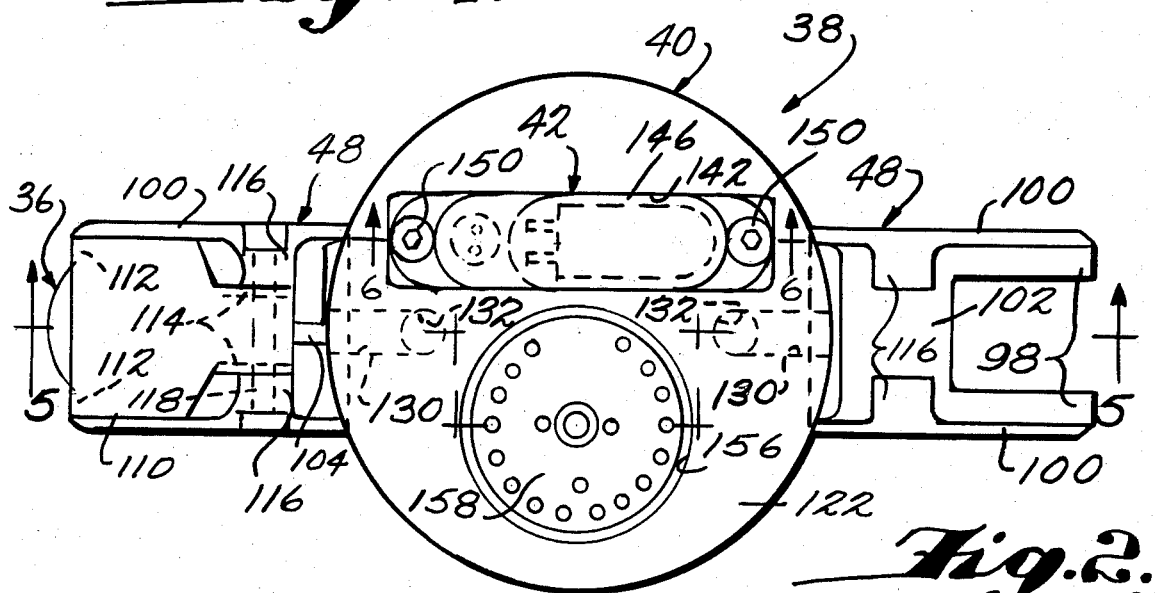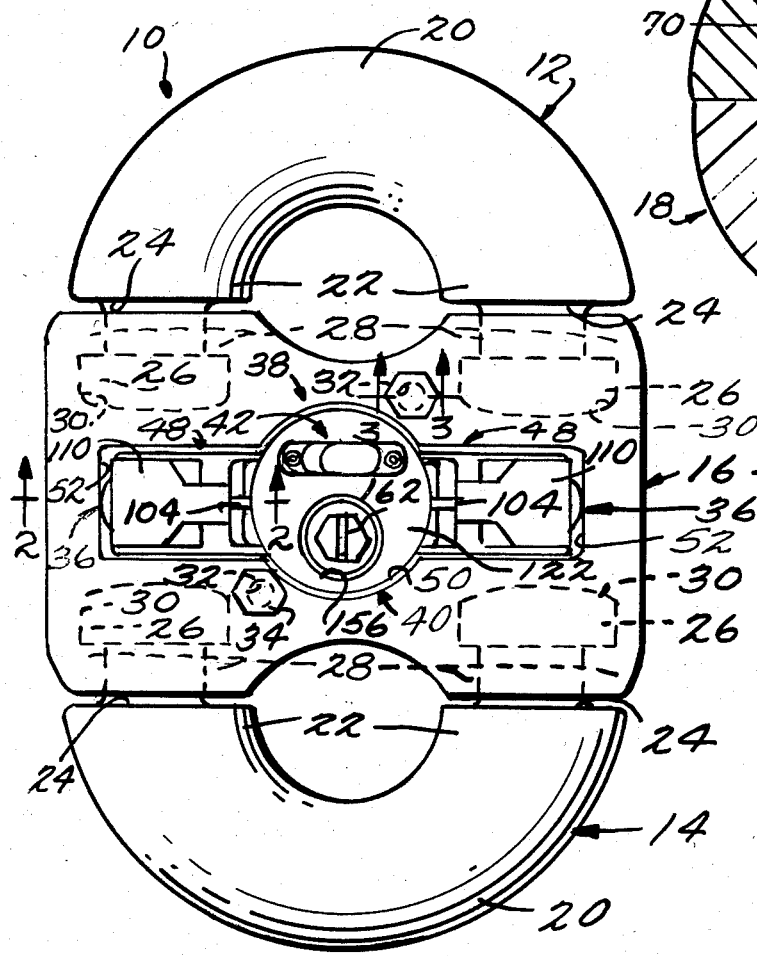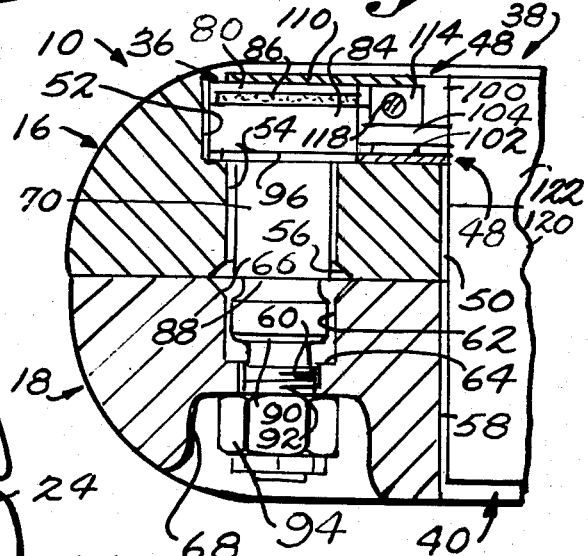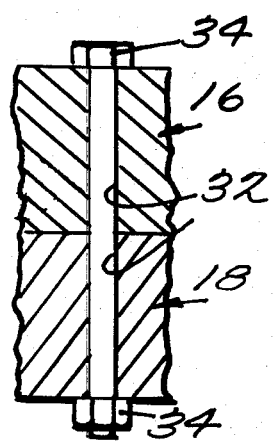

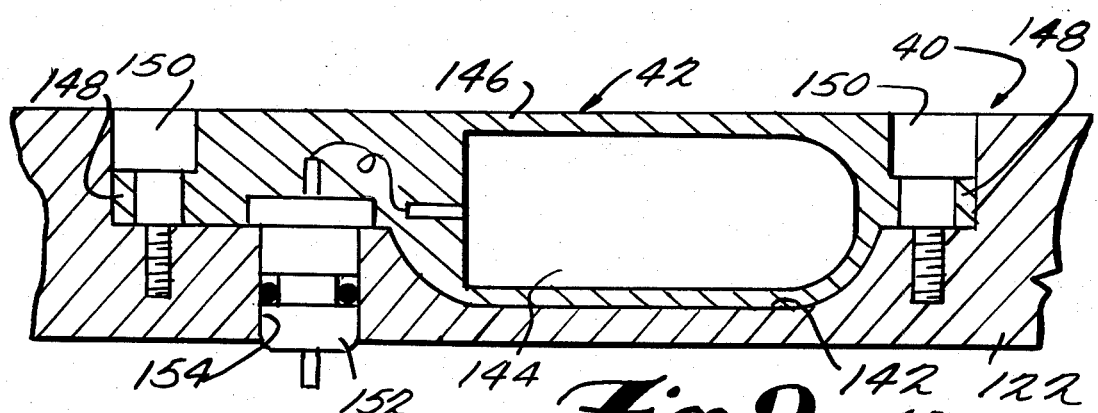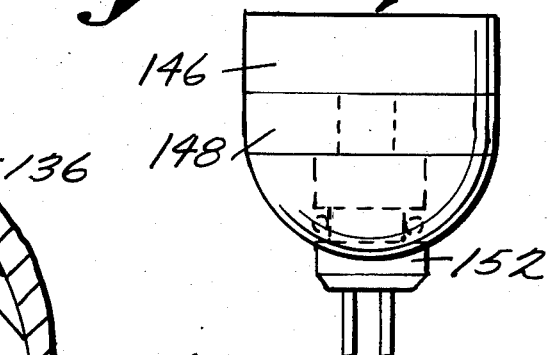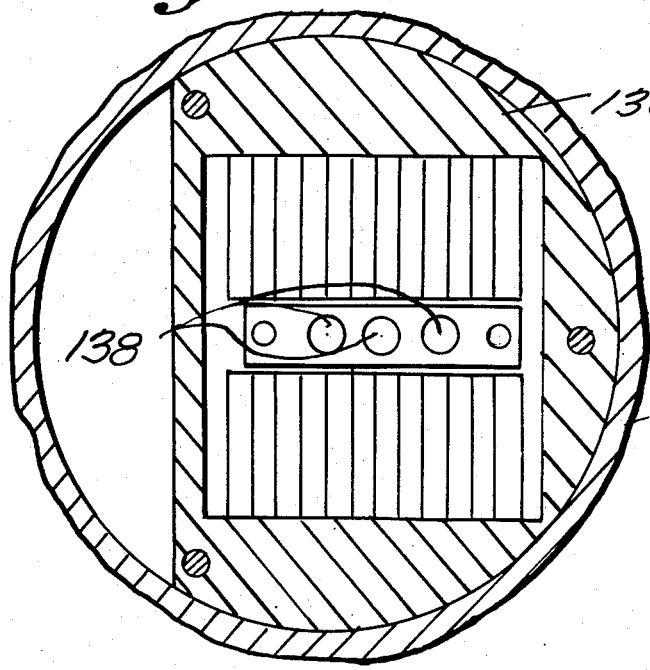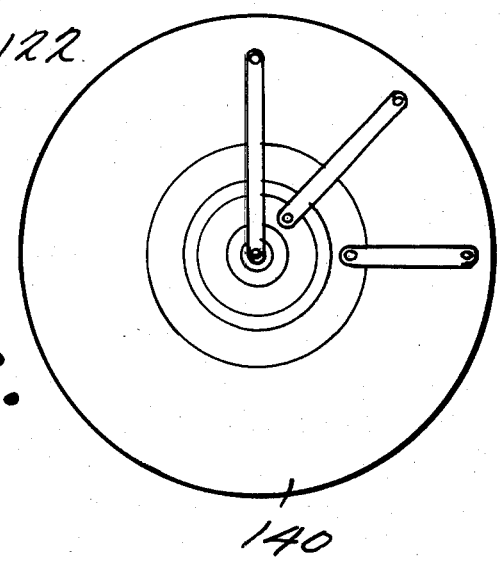

ACOUSTICALLY DETONATED EXPLOSIVELY RELEASABLE LINK

This invention relates to mooring systems and more particularly to improvements in mooring systems for semi-submersible drilling rigs and the like having the capability of emergency disengagement.

The type of mooring release system to which the present invention relates is disclosed in commonly assigned U.S. patent application Ser. No. 607,760, filed May 7, 1984. The system as disclosed in the aforesaid application includes a plurality of anchors and chains and chain handling mechanisms which enable the anchors to be hauled aboard to permit the drilling rig to be moved to another operating site. Typically, each chain handling mechanism is used in conjunction with a chain locker within which the inboard end portion of an associated length of chain is stored. From the chain locker each chain extends in cooperative relation with an anchor windlass assembly. From the anchor windlass assembly, each chain extends in cooperating relation with a fairlead assembly, which is usually in a submerged condition. The emergency release capability of the system as disclosed in the aforesaid application includes the provision of an explosively separable link within each chain which is capable of being detonated by a predetermined acoustical detonating signal so as to instantly separate the chain and enable the drilling rig to become free from its mooring system.

The preferred mode of use of each explosively separable link disclosed in the aforesaid application involves the step of maintaining the separable link normally within the chain locker and then when the emergency situation warrants to arm the separable link and move it from the chain locker through the associated anchor windlass assembly and associated fairlead assembly into an operative position of deployment outboard of the fairlead assembly. A salient feature of the explosively separable link as disclosed in the aforesaid application is that the acoustical receiver circuitry employing the separable parts of the link are such that they are within the normal peripheral confines of the link and hence are capable of passing through both the anchor windlass assembly and the fairlead assembly associated therewith.

It has been found that while the above noted mode of operation is desirable in some situations, it is more prevalent for most drilling rig operators to prefer to have the emergency release capability deployed at all times so that the conditions when emergency disengagement may be desirable are presented disenagement can be effected even without undergoing the simple procedures required to arm existing explosively separable links inboard of the fairlead assembly and move the same into a position outboard thereof.

A permanently deployable release system such as contemplated above would also desirably have the characteristics of being capable of movement in an armed condition through the restricted chain handling mechanisms such as the fairlead assembly and anchor windlass assembly. Because such capability would materially aid in reducing the time and effort required to not only deploy the system but to haul in the releasable system as well after normal operations have been completed in the usual situation where the emergency disengagement capability has not been used.

The improvements of the present invention relate to the structural modifications in the assembly for receiving the predetermined acoustical detonation signal explosively separating the link parts in response to the receipt of such a detonation signal. Where the explosively separable link is operatively deployed for periods of 3-6 months during which time the link may or may not be exploded as distinguished from a system in which explosion will shortly follow any deployment, it becomes necessary to build into the receiver-explosive assembly two specific characteristics, (1) the ability to provide electrical actuating energy within the link for such extended periods of time and (2) a more permanent and reliable protection of the assembly parts against the harsh sea environment.

It is an object of the present invention to provide improvements in an explosively separable link of the type described which will provide the enhanced characteristics noted above. In accordance with the principles of the present invention this objective is obtained by providing an improved assembly including a pressure resistant container subassembly mounted centrally with respect to the link parts and a pair of spaced explosive bolt subassemblies on opposite sides thereof. The central container serves to retain a hydrophone which receives the acoustical detonation signal in a position of exposure to water under pressure such that a signal transmitted through the water under pressure will be received. The container also houses in a protective manner batteries and electric circuitry including suitable connections for conducting an electrical current from the batteries to electrically actuated detonation means of the explosive bolt subassemblies in response to the hydrophone receiving a transmitted acoustical signal. In this way, a significantly large enough water pressure resistant space is provideed within the confines of the separable link to insure enough battery capacity to remain operable through an extended period of deployment as for example 3-6 months and beyond. Moreover, there is sufficient water pressure resistant space provided for the circuitry and connections necessary to convert a received detonation signal into an actual detonation.

Another object of the present invention is the provision of an explosively separable link of the type described which is simple in construction, effective in operation and economical to manufacture.

These and other objects of the present invention will become more apparent during the course of ths following detailed description and appended claims.

The invention may be best understood by reference to the accompanying drawings wherein illustrative embodiments are shown.

In the drawings:

FIG. 1 is a top plan view of an acoustically actuated explosively separable link embodying the principles of the present invention;

FIG. 2 is an enlarged fragmentary sectional view taken along the line 2—2 of FIG. 1;

FIG. 3 is an enlarged fragmentary sectional view taken along the line 3—3 of FIG. 1;

FIG. 4 is a top plan view of the assembly for receiving the signal and detonating the explosive in response thereto showing the same with the circuitry connector cap removed for reception of the arming plug and the righthand explosive bolt subassembly removed;

FIG. 6 is an enlarged fragmentary sectional view taken along the line 6—6 of FIG. 4;

FIG. 7 is a fragmentary sectional view taken along the line 7—7 of FIG. 4;

FIG. 8 is a fragmentary sectional view taken along the line 8—8 of FIG. 4;

FIG. 9 is an end view of the hydrophone unit;

Figure 5:
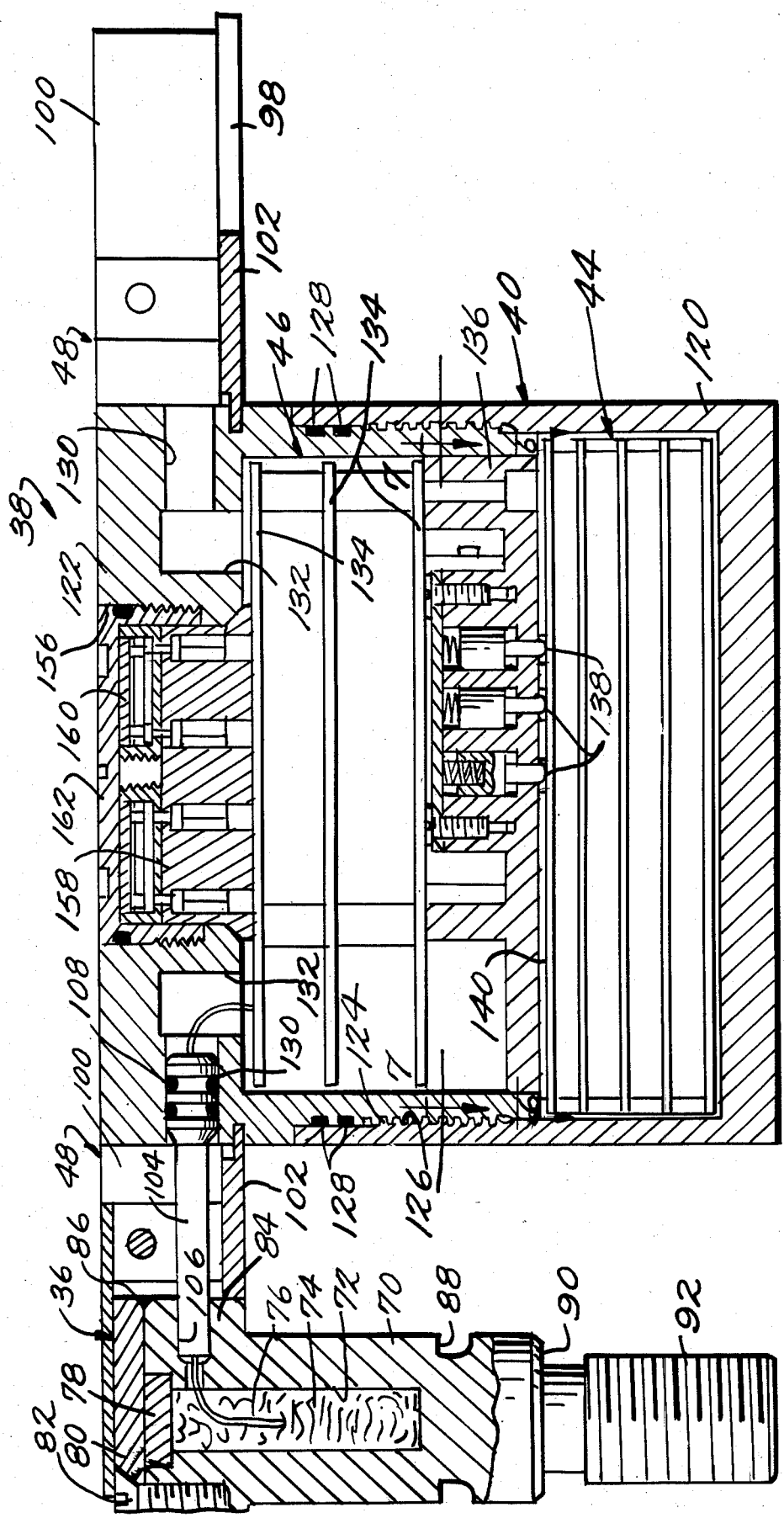
FIG. 5 is a sectional view taken along the line 5—5 of FIG. 4 showing the assembly with the arming plug and connector cap assembled.

Referring now more particularly to the drawings, there is shown in FIG. 1 thereof an acoustically actuated explosively separable link, generally indicated at 10, which embodies the principles of the present invention. Each separable link 10 is formed of a plurality of parts which are removably interengaged so as to interconnect with adjacent links of an associated length of chain or the end links of two lengths of chain. The type of installation in which the present link is particularly adapted for use is disclosed in commonly assigned patent application Ser. No. 607,760, the disclosure of which is hereby incorporated by reference into the present specification.

As best shown in FIG. 1, the parts of the separable link 10 include two generally similar opposed U-shaped link parts, generally indicated at 12 and 14, and a pair of similar cooperating half parts, generally indicated at 16 and 18. Each link part 12 and 14 includes a bight portion 20 having a pair of leg portions 22 extending therefrom. The bight portion and leg portions of each link part are of generally circular cross-sectional configuration. Formed in each leg portion 22 in spaced relation from the free end thereof is an annular groove 24. The associated free end is of reduced diameter size and shaped to provide a knob 26.

Each connector half part 16 and 18 is of generally I-shaped configuration in plan. Formed on the inner end surfaces of each connector half part are four semi-circular ridges 28 each of which is of a shape to enter laterally into an associated annular groove 24. A recess 30 is formed adjacent each ridge 28 to receive the associated knob 26. When the two connector half parts 16 and 18 are moved laterally together so that their opposed inner surfaces abut one another, the knob 26 of the leg portions 22 of the two link parts 12 and 14 are captured and retained against movement apart so long as the connector parts 16 and 18 are retained against lateral movement in a direction away from one another. A slight angular slope is provided on the inner surfaces of the knob 26 and the engaging surfaces of the ridges 28 so that a longitudinal pulling force applied to the bight portions 20 of the link parts 12 and 14 will create a relatively low percentage force component acting in a transverse direction to move the half parts 16 and 18 in a direction away from one another.

As best shown in FIG. 3, the half parts 16 and 18 are provided with a pair of through bores 32 for the reception of a pair of temporary retaining bolt assemblies 34. Bolt assemblies 34 are conventional in nature and are used only temporarily to retain the parts in properly assembled relation during transportation and to initially temporarily retain the parts in assembled relation with adjacent links of a chain. In addition to the initial securement, bolt assemblies 34 are also used as a temporary retention means during which the retention of the two half parts 16 and 18 together is changed from a pair of conventional bolt assemblies (not shown) to a pair of explosive bolt subassemblies generally indicated at 36, forming components of an assembly, generally indicated at 38.

As best shown in FIGS. 2, 4 and 5, the assembly 38 includes a central water pressure resistant container component, geneally indicated at 40, which carries a hydrophone unit, generally indicated at 42, in a position of exposure to water under pressure so that a predetermined detonating signal transmitted through the water under pressure can be received by the hydrophone unit 42. Mounted within the water pressure resistant container 40 is a series of batteries, generally indicated at 44, and a series of electrical circuit board units, generally indicated at 46, which are operable to conduct an electrical current from the battery unit 44 to the explosive bolt subassemblies 36 so as to effect detonation thereof in response to receipt of the predetermined detonation signal by the hydrophone unit 42. The container 40 includes a pair of bolt mounting components, generally indicated at 48, which serve to mount the bolt subassemblies 36 on opposite sides of the container 40.

As best shown in FIG. 2, the upper connector half part 16 of the link 10 is formed with a central opening 50, of a size to receive the container 40 therethrough with a fair clearance. Formed in the upper surface of the upper half part 16 is a pair of recesses 52 which extend radially outwardly in diametrically opposed relation from the upper end of the opening 50. A bolt receiving opening 54 extends through the upper half part 16 from each recess 52 in parallel relationship with the associated opening 52. As shown, the lower end of each bolt opening 54 is formed with a frustoconical annular recess 56. The lower half part 18 includes a central opening 58 which extends therethrough in a position to align with the opening 50 when the half parts are in operatively engaged relation. Extending through the lower half part 18 is a pair of parallel bolt openings or bores 60 disposed on opposite sides of the opening 58 in positions to register with associated openings 54 in the upper half part 16. The inner end of each bore 60 is formed with a counterbore 62 which defines an upwardly facing annular shoulder 64. The upward extremity of the counterbore is preferably provided with a frustoconical annular recess 66. The outer end of each bolt receiving bore 60 is formed with an enlarged nut receiving recess 68.

As best shown in FIG. 5, each explosive bolt subassembly 36 includes an elongated bolt shank 70 having a cavity 72 formed in the upper end thereof within which an explosive 34 is mounted. An electrically actuated detonating means in the form of an exploding bridge wire 76 is operatively connected with the explosive 74 for detonating the same in response to the conduction of an electrical current to the exploding bridge wire 76. The upper end of the cavity 72 is closed by a welded plug 78 which is further retained in position by a cover disk 80, bolted as indicated at 82, to an enlarged head portion 84 formed on the upper end of the shank. Cover disk 80 is also preferably peripherally welded to the head portion 84.

The central position of each shank 70 is formed with an exterior annular recess 88 which defines with the lower end of the cavity 72 an annular fracture section where the shank is adapted to separate when explosive 74 with associated cavity 72 is detonated. The lower end portion of each shank 70 is of reduced diameter so as to define an annular shoulder 90 which faces toward the lower free end thereof. The lower end portion of the shank 70 below the shoulder 90 is formed with exterior threads 92 to cooperate with a nut 94 (see FIG. 2) forming a component of the associated explosive bolt subassembly 36.

The head portion 84 of each bolt shank 70 has a pair of straight parallel recesses 96 (see FIG. 2) formed in opposite lower side portion thereof for receiving therein a pair of inwardly extending flanges 98 formed on the outer lower ends of a pair of vertical walls 100 provided by the associated bolt mounting component 48. The inner lower ends of each pair of vertical walls 100 are rigidly interconnected by a horizontal wall 102 which is recessed and welded to the adjacent periphery of the container component 40.

Each bolt mounting component 48 is thus configured to receive the associated explosive bolt subassembly 36 inwardly therein in a radial direction with respect to the axis of the container 40. In order to provide a water pressure tight connection for the exploding bridge wire 76 of each explosive bolt subassembly 36, one end of a tube 104 is welded within a counterbored radially extending opening 106 formed in the head portion 84. The free end of each tube 104 is enlarged and formed with exterior annular grooves for receiving O-ring seals 108.

Each bolt subassembly 36 is retained in operatively connected relation with the container 40 by a keeper plate 110. Each keeper plate 110 has a pair of spaced retaining fingers 112 (see FIG. 4) bent downwardly from its outer edge for capturing the outer periphery of the associate bolt head portion 84. The inner end of each keeper plate includes a pair of parallel downwardly bent mounting tabs 114 which extend between a pair of apertured enlargements 116 formed on the central inward portion of the vertical walls 100 of the associated mounting component 48. A retaining pin 118 extends through the apertured enlargements and registering apertures in the tabs 114 to retain the associated keeper plate 110 in retaining relation with the associated bolt subassembly 36.

The container component 40 includes a pair of cup-shaped container parts 120 and 122. The lower part 120 receives the batteries 44 in the lower interior thereof. The upper part 122 is inverted and has its lower exterior peripheral wall threaded, as indicated at 124 to mesh with interior threads 126 on the peripheral wall of the lower container part 120. The peripheral wall of the upper container part 122 is formed with exterior annular grooves in a position above the threads 124 to receive O-rings 128 which seal with the interior peripheral wall of the lower container part 120 when the parts are threadedly interengaged.

Formed in the upper wall of the upper container part 122 is a pair of diametrically opposed radially inwardly extending bores 130, the inner ends of which communicate with interior bores 132 which open downwardly into the interior of the container.

The electrical leads from each exploding bridge wire 76 extend therefrom through the associated tube 104 and associated bores 130 and 132 within the container 40 for connection with suitable circuit boards 134 carried within the container 40 above an electronic cap 136 mounted therein above the batteries 44. As best shown in FIGS. 5-7, electronic cap 136 includes contacts 138 which connect with a circular contact plate 140 connected with the stack of disk-shaped batteries 44.

The upper inverted surface of the upper inverted container part 122 has a recess 142 formed therein for receiving the hydrophone 42. Hydrophone 42 may assume any well known design, however, as shown, a Benthos AQ-156 hydrophone unit 144 is potted in a polyurethane body 146 having a pair of apertured end tabs 148. Bolts 150 extend through the end tabs 148 into the container part 122 and serve to detachably fixedly mount the potted hydrophone unit 144 within recess 142. As shown, a peripherally sealed water tight plug 152 of glass filled epoxy extends downwardly from the body 146 into an opening 154 within the container part 122 so as to enable the hydrophone unit 144 to be electrically connected with the circuit boards 134 within the container 40.

As best shown in FIGS. 1, 4 and 5, the upper container part 122 has a circular opening 156 extending therethrough in a position spaced from the hydrophone recess 142. Mounted in recessed relation within the opening is an electrical socket unit 158 for receiving a removable arming plug 160. A sealed cover 162 is removably threaded engaged within the outer end of the opening 156.

The socket unit 158 is electrically connected with the circuit boards 134 so as to prevent conductance of an electrical current to the exploding bridge wires 76 when the arming plug 160 is removed from the socket unit 158. When the arming plug 160 is engaged within the socket unit 158, the circuitry carried by the circuit boards 134 is operable to conduct an electrical current from the batteries 44 to the exploding bridge wires 76 in response to the hydrophone unit 144 sensing a predetermined acoustical detonation signal transmitted thereto through the water under pressure in which the link 10 is positioned.

The circuitry carried by the circuit boards 134 may assume any desirable configuration. A specific example of a preferred circuitry is disclosed in the aforesaid commonly owned application Ser. No. 607,760.

The link 10 of the present invention functions in a manner similar to that set forth in the aforesaid application. However, rather than being normally stored within the chain locker associated with the anchor chain in which the link is embodied, the link 10 is suitable to be deployed with the anchor and chain into an operative position within the water underpressure surrounding the site where the drilling rig is in operation. The link 10 is initially interconnected within its chain such as to interengage two end links of two lengths of chain which make up the entire assembly. Each link part 12 and 14 is hooked onto one of the associated end links and the two half parts are moved together so that the knobs 26 enter within the recesses 30 and the semicircular projections 28 enter within the annular grooves at 24. Next, a pair of conventional bolts (not shown) are mounted within the bolt receiving openings 54 and 60 in a manner similar to the bolt subassemblies 36. Further, it will be understood that initial incorporation of the link within an associated chain assembly may be performed on the tender boat in a typical installation and where the installation is to be an operative one, the preferred procedure would be to temporarily retain the parts in an engaged relation by bolts 34 thus freeing the bolt receiving openings 54 and 60 to receive bolt subassemblies 36. The bolt subassemblies are assembled with the container component 40 to form a single assembly 38 in the manner previously described. The position of bolts 34 not only frees the bolt receiving openings 54 and 60 but the recesses 52 and the central openings 50 and 58 as well. The container and bolt assembly 38 is thus capable of being moved rectilinearly into operative position, as shown in FIGS. 1 and 2. In this position, the free end of each bolt shank 70 is disposed within an associated recess 68 enabling a nut 94 to be threaded thereon to complete the securement of the assembly 38 with the link parts. After the assembly 38 has been securely fastened with the link parts, bolts 34 are removed and link 10 is ready to be deployed within the water.

A significant advantage of the present invention is that the links 10 provide a releasable function for a drilling rig throughout the operative stay at a given site which may extend from three to six months. In the event that emergency releasing procedures are not required during the operative period, each link 10 is capable of being hauled in with the associated anchor chain since the assembly 38 for receiving the acoustical signal and explosively detonating the link is contained within the confines of a link such as to pass through the chain handling equipment.

Preferably, it is desirable to stop the movement of the chain inwardly at a point when the link 10 is above the water level and has not yet passed through the anchor windlass assembly leading to the chain locker. With the link 10 in this position, it is most convenient to remove the container and bolt assembly 38. Removal is accomplished by engaging bolts 34 within the openings 32 so as to provide for temporary securement of the link parts together. Nuts 94 can then be removed allowing the container and bolt assembly 38 as a unit to be removed. After removal conventional bolts (not shown) are mounted within the bolt receiving openings 54 and 60 so as to assume the function of securing the link parts together. Bolts 34 can then be removed enabling the link 10 to pass through the anchor windlass assembly for storage within the chain locker. When the drilling rig is moved to a new site the above procedure is reversed in order to effect initial deployment of the link 10 within the water under pressure environment.

Figure 10:
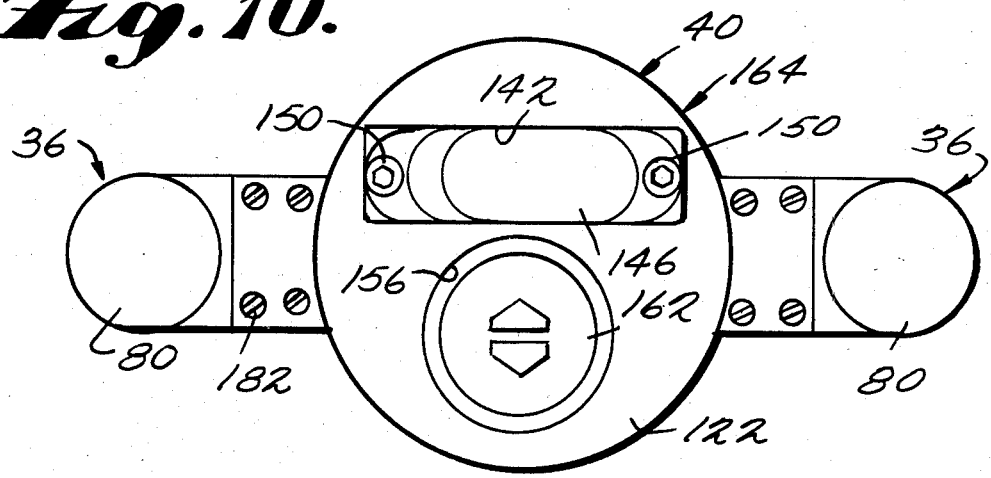
FIG. 10 is a top plan view similar to FIG. 4 showing a modified form of the assembly.
Figure 11:
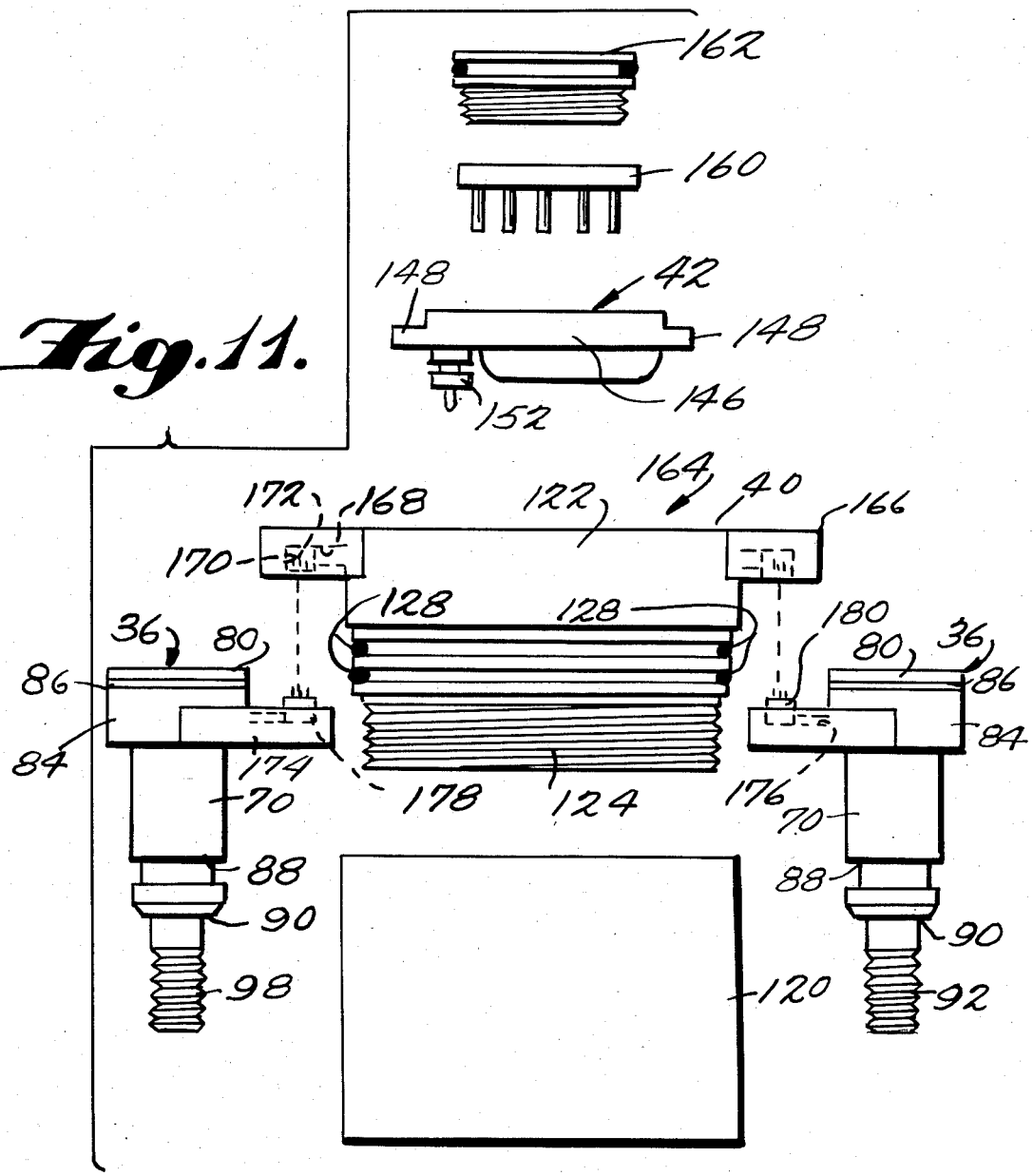
FIG. 11 is an exploded side elevation view of the assembly shown in FIG. 10.

Referring now more particularly to FIGS. 10 and 11, there is shown therein a modification of the container and bolt assembly 38 which enables the temporary retaining bolts 34 to be eliminated. The assembly 164, as shown in FIGS. 10 and 11, differs from that previously described only the manner in which the bolt subassemblies 36 are connected with container component 40. Since the assembly 164 is otherwise similar to the assembly 38, all of the common components of the assembly 164 are simply referred to by corresponding reference numbers.

As previously indicated, rather than to provide a pair of mounting components 48 such as previously described, the container component 122 is provided with a pair of mounting blocks 166 which are fixedly secured to the periphery of the upper container part 122, as by welding or the like, at diametrically opposed positions. Each mounting block is formed with an interior bore 168 which is positioned to communicate with the associated opening 130 formed in the upper container part 122. The inner end of each opening 168 communicates with a downwardly opening bore 170 within which is mounted an electrical socket unit 172. As shown socket member 172 is recessed within the bore 170. Each bolt subassembly 36 has mounted thereon a mounting block 174 in lieu of the tube 104 previously described. Each mounting block 174 is formed with an opening 176, the outer end of which is adapted to communicate with the associated bore 106 formed in the head 84 of the associated bolt shank 70. The inner end of each bore 176 communicates with an upwardly opening bore 178 within which is mounted an electrical plug unit 180. Each plug unit 180 includes an upwardly extending outer peripheral sealing portion which is adapted to sealingly engage the exposed end of the bore 170 when the plug unit 180 is engaged within the associated socket unit 172. When so engaged an electrical connection is made between the circuit board 134 within the container component 40 and the exploding bridge wire 76 of the associated bolt subassembly 36. In addition to the electrical connection which is effected by virtue of the engagement of each plug unit 180 within the cooperating socket unit 172, there is also effected a sealed connection in such a way as to prevent water under pressure from contacting the electrical connection.

In use, the bolt subassemblies 36 are utilized as the fastening means for securing the separable link parts in their interengaged relationship. In this regard it, will be noted that mounting blocks 174 fit within the recesses 52 provided in the half part 16. Whenever the link 10 is not in its operative position the container component 40 is removed from its connection with the bolt subassemblies 36 so that the explosive contained within each bolt subassembly 36 is not subject to being connected to an electrical current source capable of detonation. When it is desired to deploy the link 10 in its operative position, the link held in its assembled condition by the bolt subassemblies 36 is passed through the associated anchor windlass and moved into a postion just outboard thereof for arming. The assembly 164 is completed by moving the separate container assembly 40 into a position within the associated openings 50 and 58 which has the effect of interengaging the plug units 180 with the socket units 172 and securing the watertight seal thereof. To insure that the watertight seal will be maintained, a plurality of bolts 182 are extended through each mounting block 166 and into threaded engagement with an associated mounting block 174.

It thus will be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, the invention includes all embodiments encompassed within the spirit and scope of the following claims.

What is claimed is:

1. A separable link for use in separably connecting two lengths of chain each having a multiplicity of interconnected links configured to be moved through a restricted chain handling mechanism, said separable link comprising: a plurality of removably interconnected parts operable when interconnected to interengage with the end links of the two lenghts of chain; fastener means for operably retaining said parts in interconnected relation in interengagement with the end links; explosive means within said fastener means operable to be detonated so as to separate said fastener means, the parts of said separable link and hence the two lengths of chain; miniaturized acoustical receiver means for receiving a transmitted acoustical detonation signal and causing said explosive means to detonate said fastener means; said explosive means and said miniaturized acoustical receiver means being mounted on said parts such that when said parts are retained in interconnected relation as aforesaid the separable link is shaped to be moved through the restricted chain handling mechanism with the links of the two lengths of chain, the improvement which comprises:

said fastener means comprising a pair of bolt assemblies mounted in spaced operative relation within said parts, each of said bolt assemblies including a bolt having a cavity therein;

said explosive means including an explosive in each cavity and electrically actuated means for detonating each explosive;

said miniaturized acoustical receiver means including hydrophone means for receiving a transmitted acoustical detonation signal, battery means and circuitry means operatively connected with said hydrophone means, said battery means, and said electrically actuated detonation means for conducting an electrical current from said battery means to said electrically actuated detonation means in response to said hydrophone means receiving a transmitted acoustical detonation signal, and water pressure resistant container means mounted in said parts between said pair of spaced bolt assemblies for containing said battery means and said circuitry means including the operative connections thereof free from contact with water under pressure and for retaining said hydrophone means in a position of proximity to water under pressure such as to receive an acoustical detonation signal transmitted through said water under pressure.

2. The improvement as defined in claim 1 wherein said plurality of parts includes a pair of similar opposed U-shaped link parts having annular grooves formed therein near the free ends of the legs thereof and a pair of similar cooperating connector half parts each having opposed semicircular ridges movable laterally into a cooperating annular groove, said pair of half parts having central openings extending therethrough which are aligned when said parts are in interengagement, said aligned central openings being of a size slightly greater than the size of said container means for receiving said container mean therein.

3. The improvement as defined in claim 2 wherein one of said pair of half parts has a pair of recesses communicating with the outer end of the associated central opening therein and extending radially outwardly therefrom, each of said pair of recesses having a bolt receiving opening extending therefrom through said one half part in parallel relation with the central opening therein.

4. The improvement as defined in claim 3 wherein each of said bolt receiving openings is formed with an annular recess at the inner end thereof each of said bolts comprising a headed shank having an annular recess formed in the central exterior periphery thereof, the inner end of the cavity in each shank terminating adjacent the annular recess thereof so as to define therewith an annular section operable to fracture when the explosive in the associated cavity is detonated.

5. The improvement as defined in claim 4 wherein the other of said pair of half parts has bolt receiving bores extending therethrough in positions of alignment with the bolt receiving openings of said one half part when said half parts are in interengagement, each bolt shank having an annular shoulder facing away from the headed end thereof formed therein between the annular recess thereof and the opposite end thereof, each bolt receiving bore having a counterbore therein defining an annular shoulder facing toward and of a size to engage the annnular shoulder on the associated bolt shank, said fastener means further comprising a nut threaded on the opposite end portion of such bolt shank in operative engagement with the other of said pair of half parts.

6. The improvement as defined in claim 5 wherein the other of said pair of half parts includes a recess communicating with the outer end of each bolt receiving bore for receiving the end portion of the associated bolt shank and the nut thereon.

7. The improvement as defined in claim 6 wherein said container means comprises a pair of cooperating cup shaped container parts secured together with one inverted with respect to the other, said one inverted container part having a pair of bolt mounting components fixed thereto and extending radially outwardly therefrom at diametrically opposed positions, said pair of mounting components being disposed within the pair of recesses communicating with the central opening in said one half part.

8. The improvement as defined in claim 7 wherein each mounting component includes outwardly open parallel mounting flanges for receiving the headed end of an associated bolt when moved in a direction radially inwardly toward the inverted container part and supporting the same in an operative position, a keeper element for retaining each bolt in supported operative position with respect to the associated mounting component, and a tube extending radially between the head of each shank and the adjacent portion of the inverted container part for receiving electrical leads therethrough and retaining the same in a water pressure resistant condition.

9. The improvement as defined in claim 7 wherein each of said bolts includes a mounting block extending generally radially from the head thereof and interengaging means on each mounting block and the associated container mounting component for enabling the latter to be moved longitudinally into operative engagement with the former wherein sealed interior electrical lead contact and exterior securement can be established.

10. The improvement as defined in claim 7 wherein said inverted container part includes a recess in the inverted surface thereof, said hydrophone means being disposed in said recess.

11. The improvement as defined in claim 10 wherein said inverted container part includes a circular opening in the inverted surface thereof, an arming plug receiving socket member within said circular opening, an arming plug removably mounted in said socket, and a water pressure resistant cover removable mounted within said opening in water pressure resistant relation to said socket and plug.

12. The improvement as defined in claim 11 wherein said batteries are disk shaped and mounted within the bottom of said one container part.

13. The improvement as defined in claim 12 wherein said container parts have electrical circuitry mounted therein above said disk shaped batteries.

14. The improvement as defined in claim 3 wherein said container means comprises a pair of cooperating cup shaped container parts secured together with one inverted with respect to the other, said one inverted container part having a pair of bolt mounting components fixed thereto and extending radially outwardly therefrom at diametrically opposed positions, said pair of mounting components being disposed within the pair of recesses communicating with the central opening in said one half part.

15. The improvement as defined in claim 14 wherein each mounting component includes outwardly open parallel mounting flanges for receiving the headed end of an associated bolt when moved in a direction radially inwardly toward the inverted container part and supporting the same in an operative position, a keeper element for retaining each bolt in supported operative position with respect to the associated mounting component, and a tube extending radially between the head of each shank and the adjacent portion of the inverted container part for receiving electrical leads therethrough and retaining the same in a water pressure resistant condition.

16. The improvement as defined in claim 14 wherein each of said bolts includes a mounting block extending generally radially from the head thereof and interengaging means on each mounting block and the associated container mounting component for enabling the latter to be moved longitudinally into operative engagement with the former wherein sealed interior electrical lead contact and exterior securement can be established.

17. The improvement as defined in claim 14 wherein said inverted container part includes a recess in the inverted surface thereof, said hydrophone means being disposed in said recess.

18. The improvement as defined in claim 17 wherein said inverted container part includes a circular opening in the inverted surface thereof, an arming plug receiving socket member within said circular opening, an arming plug removably mounted in said socket, and a water pressure resistant cover removable mounted within said opening in water pressure resistant relation to said socket and plug.

19. The improvement as defined in claim 18 wherein said batteries are disk shaped and mounted within the bottom of said one container part.

20. The improvement as defined in claim 19 wherein said container parts have electrical circuitry mounted therein above said disk shaped batteries.

* * * * *